Dec. 26, 1939.　　　A. J. KIEHNE　　　2,184,779

AUTOMATIC DRIVE FOR DIES

Filed Dec. 8, 1937

INVENTOR.
Alfred J. Kiehne.
BY
Louis V. McBane
ATTORNEY.

Patented Dec. 26, 1939

2,184,779

UNITED STATES PATENT OFFICE 2,184,779

AUTOMATIC DRIVE FOR DIES

Alfred J. Kiehne, Derby Line, Vt., assignor to Union Twist Drill Company, Athol, Mass., a corporation of Massachusetts Application December 8, 1937, Serial No. 178,729

2 Claims. (Cl. 10—136)

This invention relates to a coupling for driving the spindle of a thread cutting machine from the shaft of the machine.

The common practice is to provide a fixed connection between the spindle and the drive shaft of a thread cutting machine, the spindle always rotating with the shaft. In practice, the carriage of the machine is moved up to the work and the automatic drive for advancing the carriage and turning the shaft and spindle is set into operation. The rotation of the shaft and spindle occurs in predetermined relation to the advancing movement of the carriage, the forward feed of the carriage together with the rotation of the die operating to cut threads on the work. When the carriage has advanced sufficiently far it is stopped, the rotation of the shaft and spindle being stopped at the same time. The carriage drive and the drive for the shaft and spindle then are set into operation in the reverse direction, unscrewing and retracting the die from the cut thread. The common practice as last described is characterized; first, by inflexibility of the relation between the movement of the carriage and the drive of the spindle in rotation; and second, by the location of the control over the movement of the die, both in rotation and in rectilinear movement at the power for driving the carriage and for driving the shaft of the machine. Failure to maintain proper coordination between carriage movement and spindle rotation mutilates the thread being cut. Failure to exercise proper control over the carriage feed may cause damage to the stock, to the die, or to both.

It is an object of this invention to provide a driving connection between the shaft of the machine and the spindle which carries the thread cutting die, the connection operating to provide automatic control, the control originating at the engagement of the die with the thread cut in the stock, of the spindle drive. It is an object to provide a driving connection from machine shaft to die spindle which operates, upon stopping movement of the carriage, automatically to disengage the spindle from the shaft. It is an object to provide a driving connection from machine shaft to die spindle which disassociates the carriage advancing movement from the spindle drive so that the carriage may be stopped and started, at will, without stopping shaft rotation, so long as the directions of carriage movement and shaft rotation are in proper relation. It is an object to provide a driving connection between machine shaft and die spindle which so operates that the machine shaft may be kept in continuous rotation so long as the carriage movement, whether continuous or intermittent, is in a corresponding direction, it being necessary only to reverse the direction of shaft rotation upon reversing the direction of carriage travel, the driving connection automatically operating to engage and to disengage the spindle relative to the shaft when the carriage movement starts and stops.

Other objects of the present invention will appear in the following detailed description taken in connection with the accompanying drawing in which.

Figure 1:
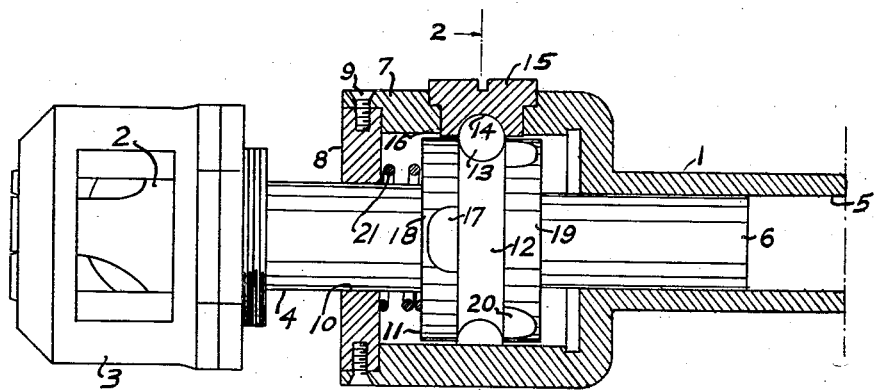
Figure 1 is a side view, partly in elevation and partly in section, illustrating a drive connection, typical of this invention, in combination with the machine shaft, spindle, and die.

This invention is concerned with the driving connection, shown in Figures 1 to 4 of the drawing, which operates automatically to connect and to disconnect the spindle, for a thread cutting die, to and from the drive shaft of a machine. In Figure 1, a hollow drive shaft is indicated at 1. The shaft 1 is mounted for rotation in a suitable carriage (not shown), conventional to such machines. The shaft 1 is driven in rotation from a suitable source of power and by suitable driving connections, which are conventional and therefore are not shown.

The thread cutting die is shown at 2. It is enclosed in a cage 3, which clamps the die onto the spindle 4, the connection between the die and the spindle being a positive one. The die and its mounting are conventional.

It is desired to provide a power drive, from the shaft to the spindle, which will be actuated by the power supplied through the shaft, and which is under the control of the engagement of the die 2 with the thread being cut. The movement, available for effecting a control action, is in the direction of the spindle axis, which movement arises by the screwing and unscrewing of the die on the cut thread. To make use of such an axial control movement, the spindle 4 is mounted for sliding movement in an axial direction, relative to the shaft 1.

The shaft 1 has a bore 4 into which the end 6 of the spindle extends with close sliding and running fit. The shaft 1 carries a cylindrical housing 7, open at one end. A collar 8 is mounted in the open end of the housing 7 and is secured in place by screws 9. The collar 8 has a bore 10 in which the spindle 4 has a close sliding and running fit. The last described structure affords support for the spindle 4 from the shaft while permitting relative movement between the shaft and the spindle either in axial reciprocation or in rotation.

According to this invention, the driving connection is such as to afford a forward drive to cut threads, a reverse drive to retract the die from the cut thread, and a neutral position where the die and spindle are disassociated from the driving power afforded by the rotating shaft. Those actions are to be under the control of the engagement between the die and the stock. Structure for performing those functions is described next.

The spindle 4 is provided with a hub 11, which is in fixed driving connection with the spindle. A track 12 extends circuferentially around the hub 11, the track 12 being substantially semicircular in profile, to engage with a ball 13. The ball 13 has rolling engagement with the track 12. The ball 13 is supported in a spherical seat 14, formed in the screw 15, which is threaded into a bore 16, through the wall of the housing 7.

The track 12 affords the neutral position of engagement with the ball 13. So long as the ball is engaged with the track 12, the shaft 1 may rotate without driving the spindle 4, the spindle 4 being held from rotation by engagement of the die 2 with a thread being cut.

The hub 11 is provided with recesses 17 in the flange 18. The flange 18 extends circumferentially around the hub at one side of the track 12. The recesses 17 are of any suitable shape adapted to receive the ball 13 in driving engagement with the face of the recesses. When the spindle 4 is displaced, relative to the housing 7 and shaft 1, in a right hand direction from the position shown in Figure 1, the ball 13 is brought into engagement with a recess 17. Power from the shaft 1, for driving the spindle 4 in rotation, is transmitted through the housing 7, ball 13, and flange 18 with which the ball 13 is in engagement.

The hub 11 has another flange 19 which extends circumferentially around the hub at the side of the track 12 distant from flange 18. The flange 19 has recesses 20 of a suitable shape and size to engage with the ball 13. When the spindle 4 is displaced relative to the housing 7 and shaft 1, to the left from the position shown in Figure 1, the ball 13 engages with the flange 19 at one or another of the recesses 20. This engagement serves to transmit power from the rotating shaft 1 to the spindle 4 and die 2.

Figure 2:
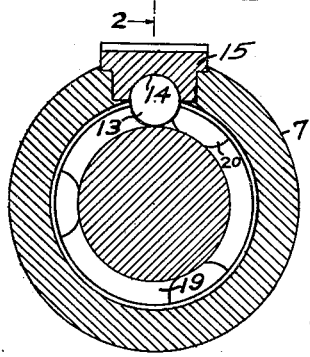
Figure 2 is a cross sectional view taken on line 2—2 of Figure 1.

The operation of the device illustrated in Figures 1 and 2 is described next. The carriage, in which the shaft 1 is mounted for rotation, is moved toward stock on which a thread is to be cut. The movement of the carriage up to the stock usually is by hand. The spindle 4 may or may not be rotating as the carriage is moved up to the stock. The spring 21 between the collar 8 and the hub 11, which spring is not essential to the invention, tends to thrust the spindle 4 to a position where the ball 13 engages with the flange 18. In such case, the spindle 4 with die 2 is carried in rotation with the shaft 1, if the shaft be rotating as the carriage is moved up to the stock. So far as the practice of this invention is concerned, the ball 13 may be in engagement with the track 12 during movement of the carriage up to the stock.

When the die is in proximity to the stock, the machine drive, for advancing the carriage to cut the thread, is set into operation. The die is moved into engagement with the stock. If the ball 13 is in engagement with the flange 18 by operation of spring 21, at the time when the die first engages the stock, the drive connection from the shaft 1 to the spindle 4 is complete and the thread cutting operation proceeds in a well known manner. If the ball 13 is in engagement with the track 12 at the time when the die first engages with the stock, the first effect is that the advancing movement of the carriage thrusts the ball 13 toward the flange 18 and causes it to engage into a slot 17, the spindle 4 being held, at that time, by engagement of the die with the stock. As soon as the ball 13 has established a driving connection with the flange 18, by the last described action, the thread cutting operation proceeds in the usual manner.

When the carriage has advanced to the point where the thread is cut as far as desired, the advancing movement of the carriage is stopped manually or automatically. The shaft 1 may continue to rotate when the carriage is stopped, and continued rotation of the die 2, in thread cutting direction, ensues. Since the spindle 4 is free to slide axially relative to the shaft 1, the die 2 climbs up the thread, which has been cut in the stock, thereby pulling the spindle 4 to the left, as viewed in Figure 1, relative to the shaft 1 and hub 7. This movement proceeds until the hub 11 has been moved sufficiently far to disengage the flange 18 from the ball 13. When that disengagement is complete, rotation of the spindle 4 and the die 2, which is resisted by the stock, ceases, although rotation of the shaft 1 may continue.

When it is desired to retract the die 2 from the cut thread, the rotation of the shaft 1 is reversed in direction. The ball 13 is engaged with the track 12 at the time when the rotation of shaft 1 is reversed. Next, at any convenient time, subsequent to or coincident with the reversal of direction of rotation of shaft 1, the drive for the carriage is set into operation to move the carriage in reverse direction away from the stock. The first effect of the carriage movement is to shift the shaft 1 to the right as viewed in Figure 1 relative to the spindle 4, which is held stationary by engagement of the die with the stock. The shifting movement brings the ball 13 into engagement with one or another of the slots 20 in the flange 19 to establish a driving connection between the shaft 1 and the spindle 4. When this driving connection has been established, the movement of the die 2, both in rotation and retraction, takes place in the conventional manner for unscrewing the die from the cut thread. Once the die is free from the cut thread, the tendency of the drive connection is for the hub 11 to find that position where the ball 13 rides in track 12. The spring 21, if present, biases the spindle 14 to a position where the ball 13 engages with flange 18, preparatory to the next following thread cutting operation.

Figure 3:
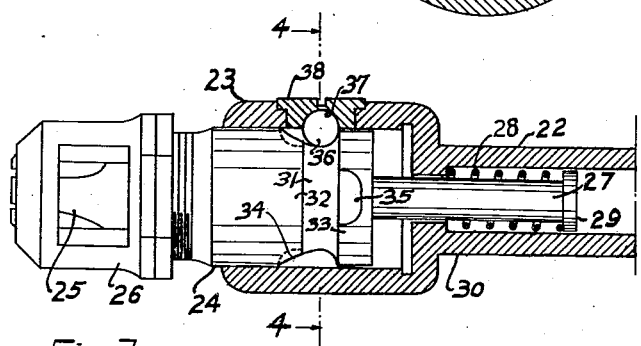
Figure 3 is a side view, partly in elevation and partly in section, illustrating another typical drive connection of this invention, in combination with shaft and spindle.
Figures 4, 5:
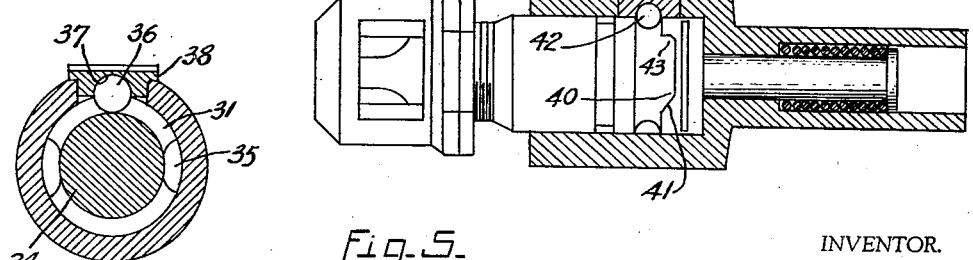
Figure 4 is a cross sectional view taken on line 4—4 of Figure 3.
Figure 5 is a view similar to that of Figure 3, showing a modification of the invention.

Figures 3 and 4 show a drive connection between machine shaft and die spindle which has the same operating characteristics as the device shown in Figure 1 and 2 and described above. The structural differences between the devices of Figures 1 and 3 are only those essential to operating convenience as determined by the size of the operating parts.

In Figure 3, the machine shaft is shown at 22, a housing 23 being fixed onto the shaft. The spindle 24 has bearing support in the housing 23 and carries the conventional die 25, in cage 26. The spindle 24 has a stem 27 which extends into the hollow shaft 22. A spring 28 engages with the head 29 of stem 27, and with a shoulder 30 formed within the bore of shaft 22. The spindle 24 is provided with a circumferentially extending track 31, there being shoulders 32 and 33 at opposite sides of the track 31. Recesses 34 and 35 are provided in the shoulders 32 and 33, respectively. A ball 36 is supported in a spherical seat 37, in nut 38, threaded into a bore through the wall of housing 23.

The ball 36 may ride in the track 31 with rolling engagement, or it may engage either shoulder 32 or shoulder 33, at a recess 34 or a recess 35. Although there are some differences in structure between the two forms of invention shown, it is believed that the equivalence of the various elements of the device, shown in Figure 3, with the elements shown in device of Figure 1 will be apparent. The mode of operation of the device shown in Figure 3 is the same as that for the device shown in Figure 1, as will be apparent to one skilled in the art.

The modification shown in Figure 5 differs from that of Figure 3 in the shape of the recesses 40, as compared with the recesses 35. The recesses 40 are made with sloping faces 41 so that no driving engagement may occur between such faces and the ball 42. Driving engagement may occur only between faces 43 and the ball 42. The effect of sloping faces 41 is to provide a rachet-like drive.

The operation of the device of Figure 5 is like that of Figure 3 except that, if ball 42 be in engagement with the recess 40, opposite to that in which driving connection should occur, the effect of the sloping faces 41 would be to move the driving connection relative to the shaft so as to bring the ball into engagement with the other recess.

The invention has been described in detail by way of illustration. It is not intended so to limit the invention. Variations in the details of construction may be made, as will be apparent to one skilled in the art, without departing from the scope of the invention as defined in the following claims.

What I claim as my invention is as follows:

1. An automatic drive including a hollow shaft, and a spindle, one end of the spindle being arranged in the hollow shaft, there being running and sliding engagement between the shaft and spindle to afford support for the spindle; the spindle being rotatable with the shaft, rotatable relative to the shaft, and reciprocable relative to the shaft; the other end of the spindle projecting from the shaft and being adapted to mount a thread cutting die, a driving means fixed to the shaft and including a ball seated on the shaft to roll freely, a driven means fixed to the spindle and located within the hollow shaft, said driven means including an annular track concentric with the axis of rotation and shaped for freely rolling engagement with the ball, said driven means including a shoulder at each side of the track, there being slots in the shoulders opening into the track and adapted to receive the ball in engagement with a shoulder, the driving means and driven means being relatively reciprocable by relative reciprocation of the shaft and spindle to shift between ball-and-track engagement and ball-and-recess engagement; said shaft, spindle, driving means and driven means being free for relative reciprocation to effect driving connection and dis-connection under the control of the action of the thread cutting die on the stock together with movement of the shaft in rotation and in axial direction relative to the stock.

2. An automatic drive including a hollow shaft, and a spindle, one end of the spindle being arranged in the hollow shaft, there being running and sliding engagement between the shaft and spindle to afford support for the spindle; the spindle being rotatable with the shaft, rotatable relative to the shaft, and reciprocable relative to the shaft; the other end of the spindle projecting from the shaft and being adapted to mount a thread cutting die, a driving means fixed to the shaft and including a ball seated on the shaft to roll freely, a driven means fixed to the spindle and located within the hollow shaft, said driven means including an annular track concentric with the axis of rotation and shaped for freely rolling engagement with the ball, said driven means including a shoulder at each side of the track, there being slots in the shoulders opening into the track and adapted to receive the ball in engagement with a shoulder, the driving means and driven means being relatively reciprocable by relative reciprocation of the shaft and spindle to shift between ball-and-track engagement and ball-and-recess engagement; said shaft, spindle, driving means and driven means being free for relative reciprocation to effect driving connection and dis-connection under the control of the action of the thread cutting die on the stock together with movement of the shaft in rotation and in axial direction relative to the stock, a spring between the shaft and spindle acting to move the spindle to that position of reciprocation relative to the shaft where drive of the shaft from the spindle occurs in the direction for cutting a thread on stock.

ALFRED J. KIEHNE.